United States Patent
Kim et al.

(10) Patent No.: US 7,760,307 B2
(45) Date of Patent: Jul. 20, 2010

(54) MOTHER GLASS FOR A LIQUID CRYSTAL DISPLAY WITH PASSIVATION LAYER AND BARRIER LAYER AND METHOD OF FABRICATING LIQUID CRYSTAL DISPLAY USING THE SAME

(75) Inventors: Jin Hwan Kim, Gyeonsangbuk-do (KR); Dae Hyun Jang, Daejeon (KR)

(73) Assignee: LG. Display Co., Ltd., Seoul (KR)

( * ) Notice: Subject to any disclaimer, the term of this patent is extended or adjusted under 35 U.S.C. 154(b) by 222 days.

(21) Appl. No.: 11/821,146

(22) Filed: Jun. 22, 2007

(65) Prior Publication Data
US 2008/0013034 A1  Jan. 17, 2008

(30) Foreign Application Priority Data
Jun. 30, 2006  (KR) .................. 10-2006-0060955

(51) Int. Cl.
  G02F 1/1333  (2006.01)
  G02F 1/1339  (2006.01)
  G02F 1/13  (2006.01)
(52) U.S. Cl. .................. 349/138; 349/153; 349/158; 349/187
(58) Field of Classification Search ............... 349/187
See application file for complete search history.

(56) References Cited

U.S. PATENT DOCUMENTS

| | | | |
|---|---|---|---|
| 7,009,675 B2 * | 3/2006 | Han et al. | 349/153 |
| 7,298,449 B2 * | 11/2007 | Tatemura et al. | 349/155 |
| 2004/0074366 A1 * | 4/2004 | Choo et al. | 83/886 |
| 2004/0150776 A1 * | 8/2004 | Kim | 349/138 |
| 2004/0227864 A1 * | 11/2004 | Kim | 349/43 |
| 2004/0263771 A1 * | 12/2004 | Jeong et al. | 349/187 |

* cited by examiner

*Primary Examiner*—Andrew Schechter
*Assistant Examiner*—Paul C Lee
(74) *Attorney, Agent, or Firm*—Brinks Hofer Gilson & Lione

(57) ABSTRACT

A mother glass for a liquid crystal display and a method of fabricating a liquid crystal display using the same are disclosed. The mother glass includes a plurality of cell areas where a plurality of thin films is formed on a substrate, a dummy area disposed outside the plurality of cell areas on the substrate, and a passivation layer. The passivation layer is coated on substantially an overall portion of the plurality of cell areas, and formed in a straight line-like band form along a transverse direction in the dummy area to isolate the cell areas from each other in a longitudinal direction.

12 Claims, 8 Drawing Sheets

MOTHER GLASS FOR A LIQUID CRYSTAL DISPLAY WITH PASSIVATION LAYER AND BARRIER LAYER AND METHOD OF FABRICATING LIQUID CRYSTAL DISPLAY USING THE SAME

This application claims the benefit of Korean Patent Application No. 10-2006-0060955 filed in Korea on Jun. 30, 2006, which is hereby incorporated by reference for all purposes as if fully set forth herein.

BACKGROUND

1. Field

Exemplary embodiments of the present invention relate to a mother glass for a liquid crystal display and a method of fabricating a liquid crystal display using the same.

2. Description of the Related Art

Liquid crystal displays generally include a thin film transistor (TFT) array substrate and a color filter substrate that are assembled with a substantially constant distance therebetween, and a liquid crystal layer interposed between the two substrates.

The liquid crystal displays are fabricated through various processes such as a deposition process, a photolithography process, and an etching process.

The photolithography process includes a coating process of photoresist, an exposure process, a developing process, and an etching process.

When the TFT array substrate and the color filter substrate are fabricated using a photolithography process, a thin film is deposited on each of the TFT array substrate and the color filter substrate and a photolithography etching process using a mask is performed on the two substrates several times. Therefore, there occurs critical dimension (CD) variation by the photolithography process. Due to the critical dimension (CD) variation, stains frequently appear during a screen driving, thereby causing non-uniformity of luminance of the liquid crystal display.

SUMMARY

Accordingly, exemplary embodiments of the present invention are directed to a mother glass for a liquid crystal display and a method of fabricating a liquid crystal display using the same that substantially obviate one or more of the problems due to limitations and disadvantages of the related art.

Advantages of exemplary embodiments of the present invention are to provide a mother glass for preventing screen stains and non-uniformity of luminance caused by critical dimension (CD) variation during a photolithography process by changing a structure of a passivation layer, and a method of fabricating a liquid crystal display using the mother glass.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of exemplary embodiments of the present invention, as embodied and broadly described, a mother glass includes a plurality of cell areas where a plurality of thin films is formed on a substrate, a dummy area provided outside the plurality of cell areas on the substrate, and a passivation layer that is coated on an overall portion of each cell area, and formed in a straight line-like band form along a transverse direction in the dummy area to isolate the cell areas from each other in a longitudinal direction.

The passivation layer may have a thickness of about 2.0-2.3 μm.

The mother glass for the liquid crystal display may further include a barrier that is positioned between the cell areas arranged in the transverse to isolate the neighboring cell areas in the transverse from each other.

The barrier may be formed of one of an organic material such as photoacryl and benzocyclobutene (BCB) and an inorganic material such as silicon oxide ($SiO_x$) and silicon nitride ($SiN_x$).

The barrier may be formed of the same material as the passivation layer.

The barrier may have the substantially same thickness as the passivation layer.

The thin film may be a thin film transistor array including a gate electrode divided from a gate line, a gate insulating layer positioned on the gate electrode, a semiconductor layer positioned on an upper portion of the gate insulating layer corresponding to the gate electrode, and a source electrode and a drain electrode that are spaced apart from each other with the semiconductor layer therebetween.

In another aspect, a mother glass for a liquid crystal display includes a plurality of cell areas where a plurality of thin films is formed on a substrate, each cell area including an active area defined by the plurality of thin films, and a pad area where a plurality of electrode pads is formed at an edge of the active area, a dummy area provided outside the plurality of cell areas on the substrate, and a passivation layer that is coated on the entire surface of the substrate including the cell area and the dummy area, and includes an opening in the pad area and the dummy area adjacent to the pad area.

In still another aspect, a method of fabricating a liquid crystal display includes preparing a first mother glass including a plurality of cell areas where a plurality of thin film transistor arrays is formed, and a dummy area provided outside the plurality of cell areas, coating a passivation layer on the entire surface of the first mother glass, and patterning the passivation layer to coat the passivation layer on the entire surface of each cell area, and forming the passivation layer in a straight line-like band form along a transverse direction in the dummy area to isolate the cell areas from each other in a longitudinal direction.

In yet still another aspect, a method of fabricating a liquid crystal display includes preparing a first mother glass including a plurality of cell areas and a dummy area provided outside the plurality of cell areas, each cell area including an active area where a thin film transistor array is formed, and a pad area, coating a passivation layer on the entire surface of the first mother glass, and patterning the passivation layer in the pad area and the dummy area adjacent to the pad area.

It is to be understood that both the foregoing general description and the following detailed description are exemplary and explanatory and are intended to provide further explanation of the invention as claimed.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
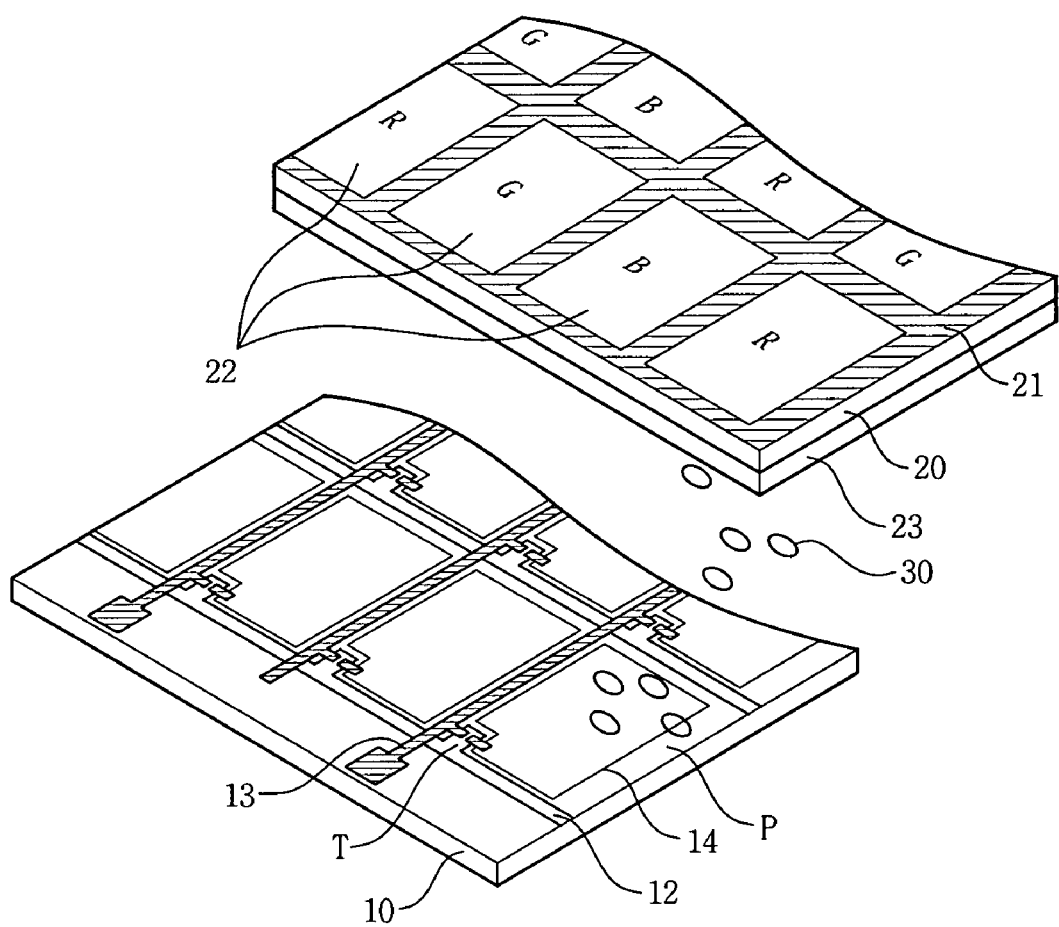
FIG. 1 is an exploded perspective view of a general liquid crystal display.
Figure 2:
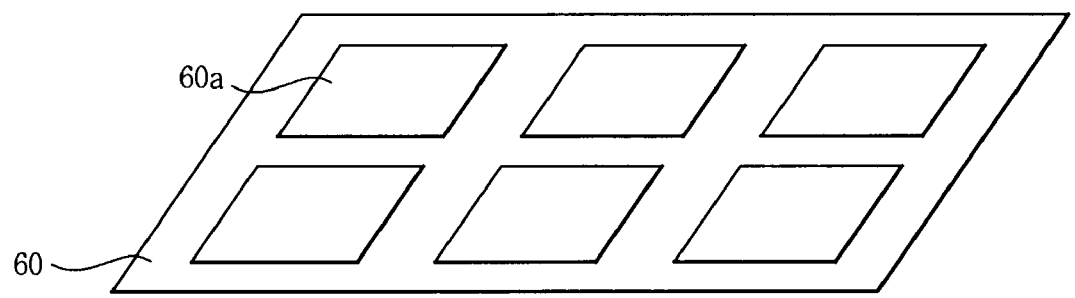
FIG. 2 illustrates a mother glass for a general liquid crystal display.
Figure 2:
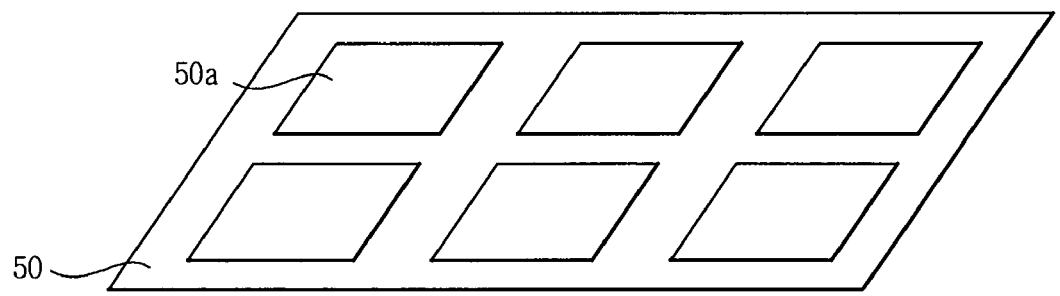

FIG. 1 is an exploded perspective view of a general liquid crystal display. FIG. 2 illustrates a mother glass for a general liquid crystal display.

First, referring to FIG. 1, a general liquid crystal display includes a lower substrate 10 and an upper substrate 20, and a liquid crystal layer between the lower substrate 10 and the upper substrate 20.

The lower substrate 10 is called an array substrate, and includes a plurality of gate lines 12 and a plurality of data lines 13. The plurality of gate lines 12 are arranged in one direction with a substantially constant distance therebetween, and the plurality of data lines 13 are arranged in a direction substantially perpendicular to the gate lines 12. The plurality of gate lines 12 and the plurality of data lines 13 define a plurality of pixel areas P.

A pixel electrode 14 is formed in each pixel area P. A thin film transistor T performing a switching function is formed at each of intersections of the plurality of gate lines 12 and the plurality of data lines 13. The thin film transistor T is turned on in response to a control signal applied on the gate line 12, and a data signal of the data line 13 is applied to the pixel electrode 14 due to the turned-on thin film transistor T.

The upper substrate 20 is called a color filter substrate, and includes a black matrix 21 and red (R), green (G), and blue (B) color filter layers 22. The black matrix 21 blocks light transmitted outside the pixel area P, and the red (R), green (G), and blue (B) color filter layers 22 express color corresponding to each pixel area P. A common electrode 23 and an upper alignment layer (not shown) are formed on the color filter layer 22 to display an image. The common electrode 23 may be formed on the lower substrate 10 to form a parallel electric field between the pixel electrodes 14.

The liquid crystal display is fabricated by repeatedly performing various processes such as a deposition process, a photolithography process, and an etching process on each of the lower substrate 10 and the upper substrate 20.

One liquid crystal panel is not assembled using one lower substrate 10 and one upper substrate 20. As illustrated in FIG. 2, a pair of large-sized mother glasses 50 and 60 is prepared for an increase in production efficiency. A plurality of liquid crystal panel areas 50a and 60a is designed on the mother glasses 50 and 60, respectively, and a thin film transistor (TFT) array and a color filter array are provided in the liquid crystal panel areas 50a and 60a, respectively.

In other words, the liquid crystal display is fabricated using the first mother glass 50 including the thin film transistor array and the second mother glass 60 including the color filter array.

When fabricating the liquid crystal display using the mother glass, CD variation of photoresist caused during the photolithography process is prevented by an improved structure of a passivation layer coated on the mother glass to prevent stains caused by the CD variation.

A method of fabricating the liquid crystal display includes an array process, a cell process, and a module process. The passivation layer is generally formed during the array process. More specifically, the passivation layer is formed during a fabrication process of each of the array substrate and the color filter substrate before the array substrate and the color filter substrate are assembled.

In particular, in the array process of the array substrate, a plurality of electrodes constituting a switching device may be formed on the substrate, and the passivation may be then formed prior to forming the pixel electrode.

Because the passivation layer is open in a sealant formation area, scribe lines, or a connection area (contact hole) of a drain electrode and a pixel electrode, a flow amount of photoresist increases in an open area of the passivation layer during a subsequent photolithography process, thereby increasing the appearance of stains.

For instance, if the photoresist is coated using a spin coating method, the photoresist is dispersed on the mother glass in a radial manner. Hence, a flow amount of photoresist relatively increases in the open area of the passivation layer (i.e., the sealant formation area, the scribe lines, or the connection area (contact hole) of the drain electrode and the pixel electrode) such that the flow amount of photoresist is not constant due to a continual rotation of the mother glass.

Hence, the photoresist is gathered inside the open area of the passivation layer, thereby causing dispersion stains. This leads to non-uniformity of luminance of the liquid crystal display.

Accordingly, exemplary embodiments of the structure of the passivation layer and the mother glass for the liquid crystal display will be described below so as to prevent the dispersion stains.

First Exemplary Embodiment

Figure 3A:
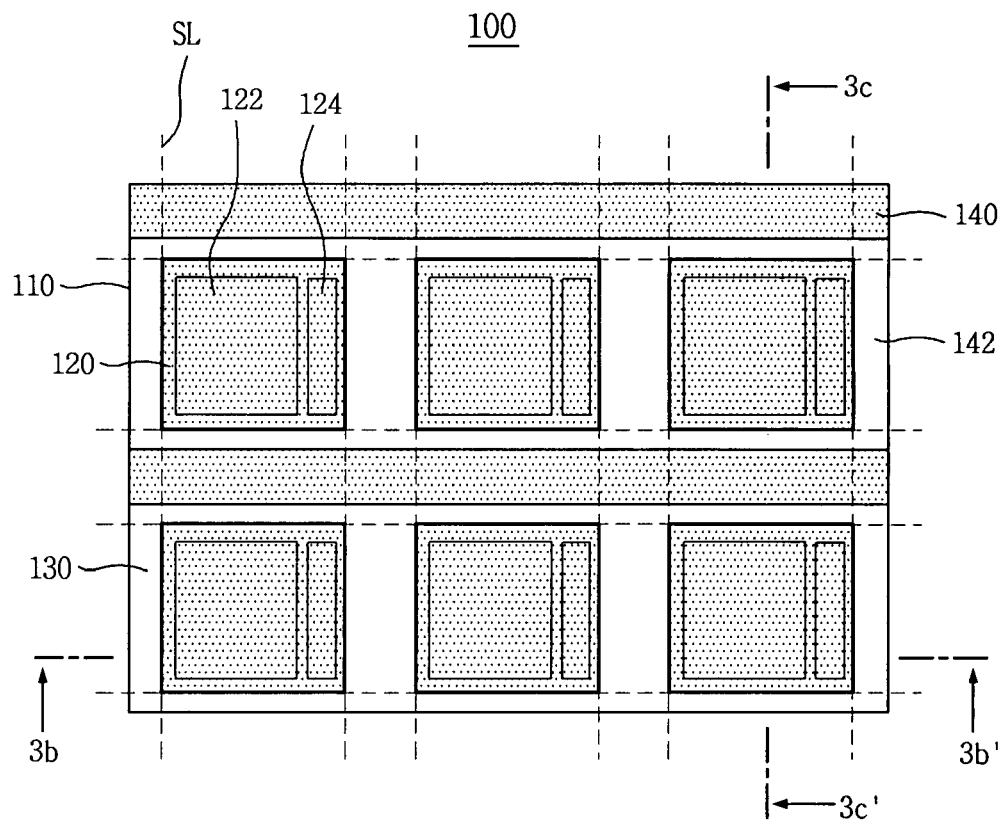
FIG. 3A is a plane view of a mother glass for a liquid crystal display according to a first exemplary embodiment of the present invention.
Figure 3B:
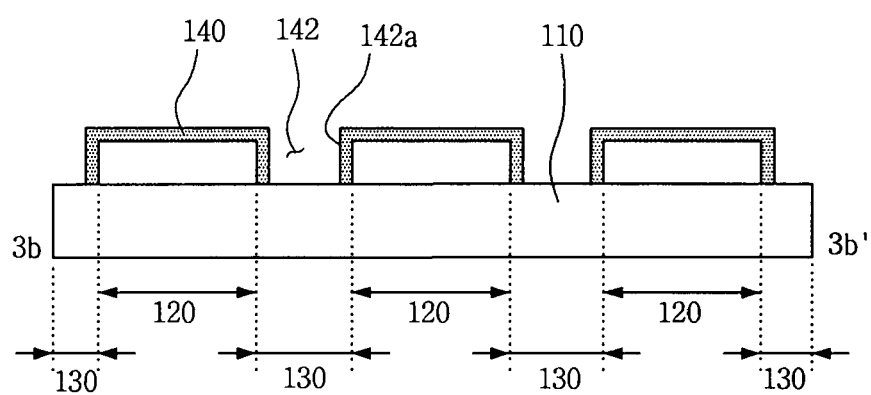
FIG. 3B is a cross-sectional view taken along line 3b-3b' of FIG. 3A.
Figure 3C:
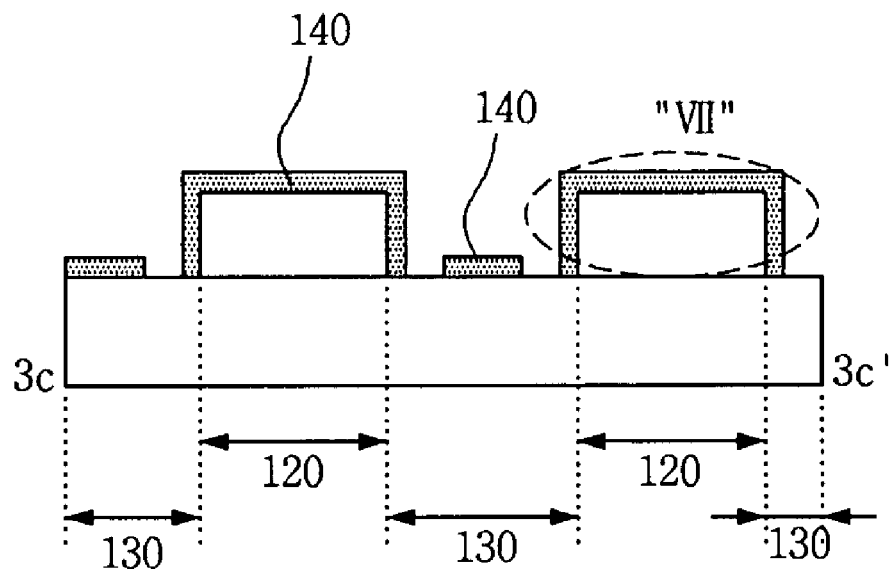
FIG. 3C is a cross-sectional view taken along line 3c-3c' of FIG. 3A.
Figure 4:
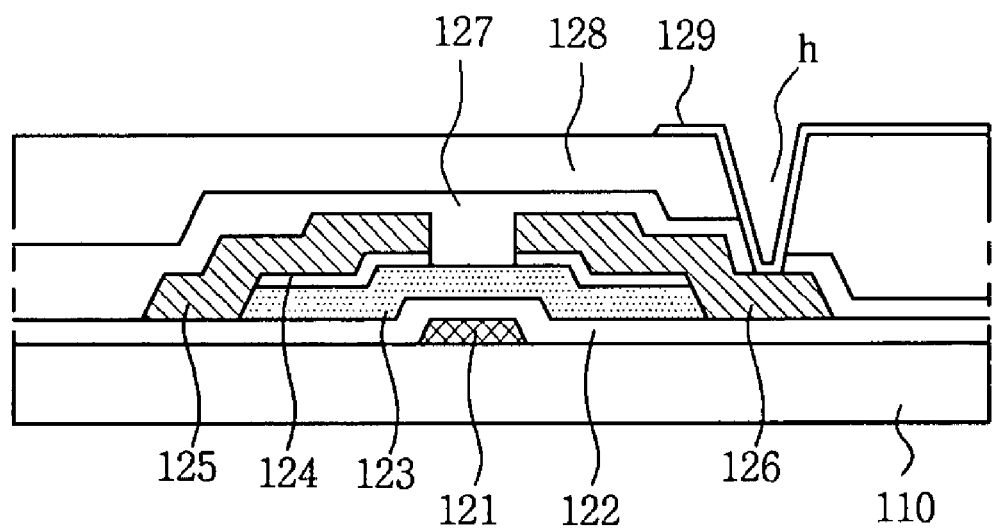
FIG. 4 is a partial cross-sectional view of a pixel in an area VII of FIG. 3C.

FIG. 3A is a plane view of a mother glass 100 for a liquid crystal display according to a first exemplary embodiment of the present invention, FIG. 3B is a cross-sectional view taken along line 3b-3b' of FIG. 3A, and FIG. 3C is a cross-sectional view taken along line 3c-3c' of FIG. 3A. FIG. 4 is a partial cross-sectional view of a pixel in an area VII of FIG. 3C.

First, referring to FIG. 3A, the mother glass 100 includes a plurality of cell areas 120 where a plurality of thin films is formed on a transparent substrate 110, a dummy area 130 provided outside the plurality of cell areas 120 on the transparent substrate 110, and a passivation layer 140. The passivation layer 140 covers the entire surface of the transparent substrate 110 including the plurality of cell areas 120 and the dummy area 130, and includes an opening 142 on a predetermined portion thereof.

The mother glass 100 is cut along scribe lines SL shown in FIG. 3A in a subsequent cutting process to form an array substrate or a color filter substrate in each cell area 120.

The plurality of cell areas 120 is arranged with a substantially constant distance therebetween. The plurality of thin films may be a TFT array or a color filter array based upon the array substrate or the color filter substrate. The dummy area 130 having a predetermined width is provided between the plurality of cell areas 120.

Each cell area 120 is divided into an active area 122 where an image is displayed, and a pad area 124 where a plurality of electrode pads for applying signals from the outside is formed at an edge of the active area 122. The pad area 124 may be provided not only at the edge of the active area 122 but also on an upper portion or a lower portion of the active area 122 adjacent to the edge of the active area 122, based upon a panel type.

The passivation layer 140 is coated on an overall portion of each cell area 120. In the dummy area 130, the passivation layer 140 is formed in a straight line-like band form along a transverse direction to isolate the cell areas 120 from each other in a longitudinal direction. In the dummy area 130, the passivation layer 140 includes the opening 142 along edges of each cell area 120.

Furthermore, the opening 142 of the passivation layer 140 may be formed on a contact hole for connecting a drain electrode (not shown) to a pixel electrode (not shown) in the active area 122.

The opening 142 of the passivation layer 140 may be formed through a photolithography process using a separate mask.

In FIG. 3A, an area where the passivation layer 140 is coated is indicated by hatching for the convenience of understanding to distinguish the passivation layer 140 from the opening 142.

The passivation layer 140 may be formed of one of an organic material such as photoacryl and benzocyclobutene (BCB) and an inorganic material such as silicon oxide ($SiO_x$) and silicon nitride ($SiN_x$). The passivation layer 140 may have a thickness of about 2.0-2.3 μm. Therefore, the passivation layer 140 includes a cut surface 142a of about 2.0-2.3 μm thick in the opening 142.

As illustrated in FIGS. 3B and 3C, the opening 142 of the passivation layer 140 is formed between the cell areas 120 arranged in the transverse direction, and the passivation layer 140 is formed between the cell areas 120 arranged in a longitudinal direction to isolate the cell areas 120 in the longitudinal direction from each other.

FIGS. 3B and 3C only have conceptually illustrated the passivation layer 140 coated on the plurality of cell areas 120. In fact, the structure of the passivation layer 140 coated on the plurality of cell areas 120 may vary in accordance with the structure of the thin films inside the cell areas 120.

For instance, as illustrated in FIG. 4, when the cell area 120 is the TFT array, the cell area 120 includes a thin film transistor, a passivation layer 127 for protecting the thin film transistor, and an organic insulating layer 128 and a pixel electrode 129 positioned on the passivation layer 127.

The thin film transistor includes a gate electrode 121, a gate insulating layer 122 for insulating the gate electrode 121, an active layer 123 positioned on an upper surface of the gate insulating layer 122, an ohmic contact layer 124 positioned on an upper surface of the active layer 123, a source electrode 125, and a drain electrode 126. The gate electrode 121 is connected to a gate line used to transmit a gate signal to receive the gate signal. The source electrode 125 and the drain electrode 126 are spaced apart from each other on the ohmic contact layer 124 with a predetermined distance therebetween.

Due to the above structure of the cell area 120, the passivation layer 127 is coated on the entire surface of the cell area 120 including the thin film transistor, and an area for connecting the drain electrode 126 of the thin film transistor to the pixel electrode 129 is an opening.

Accordingly, because the dummy area 130 including the passivation layer 140 has a reduced area in the mother glass 100 for the liquid crystal display according to the first exemplary embodiment of the present invention, an increase in a flow amount of photoresist in the dummy area 130 including the passivation layer 140 is suppressed when the photoresist is coated during a subsequent photolithography process. As a result, the photoresist is uniformly coated on the entire portion of the cell areas 120, thereby preventing the appearance of screen stains.

Second Exemplary Embodiment

Figure 5A:
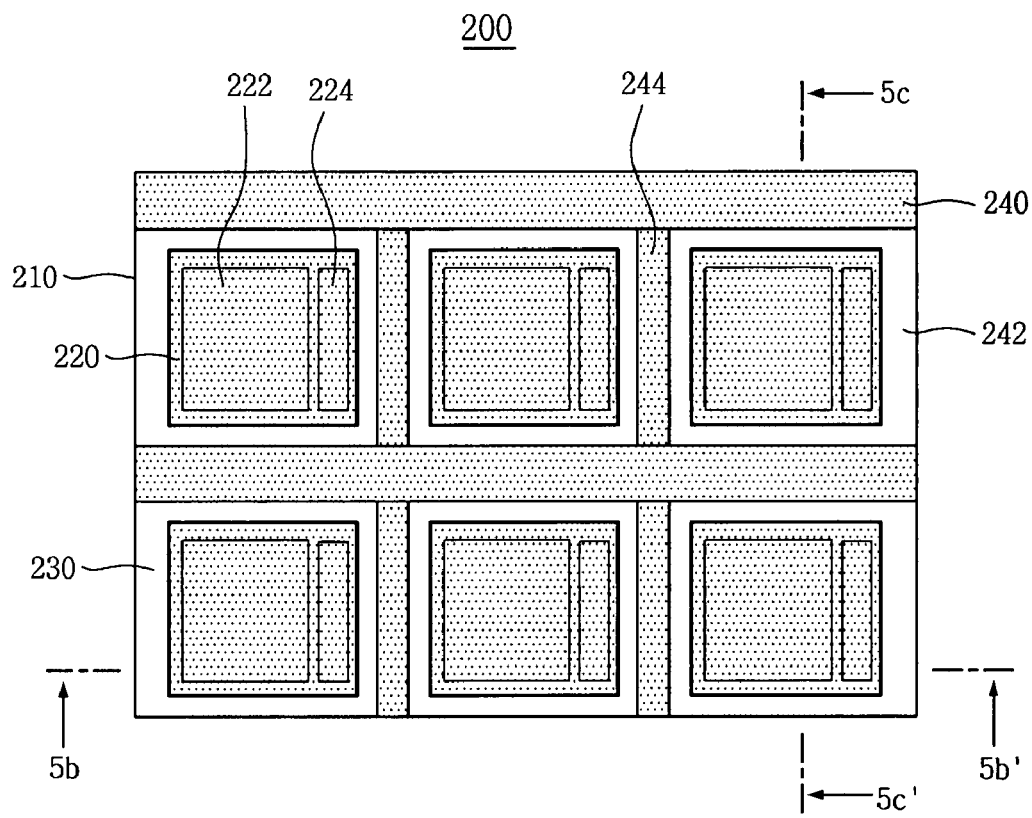
FIG. 5A is a plane view of a mother glass for a liquid crystal display according to a second exemplary embodiment of the present invention.
Figure 5B:
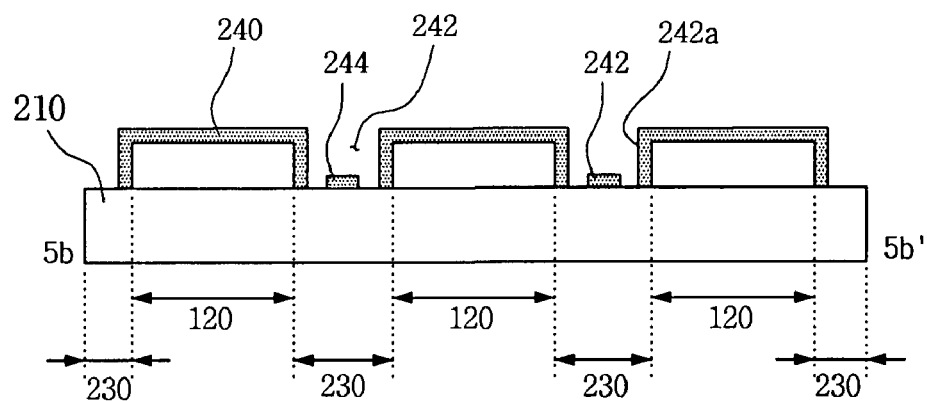
FIG. 5B is a cross-sectional view taken along line 5b-5b' of FIG. 5A.
Figure 5C:
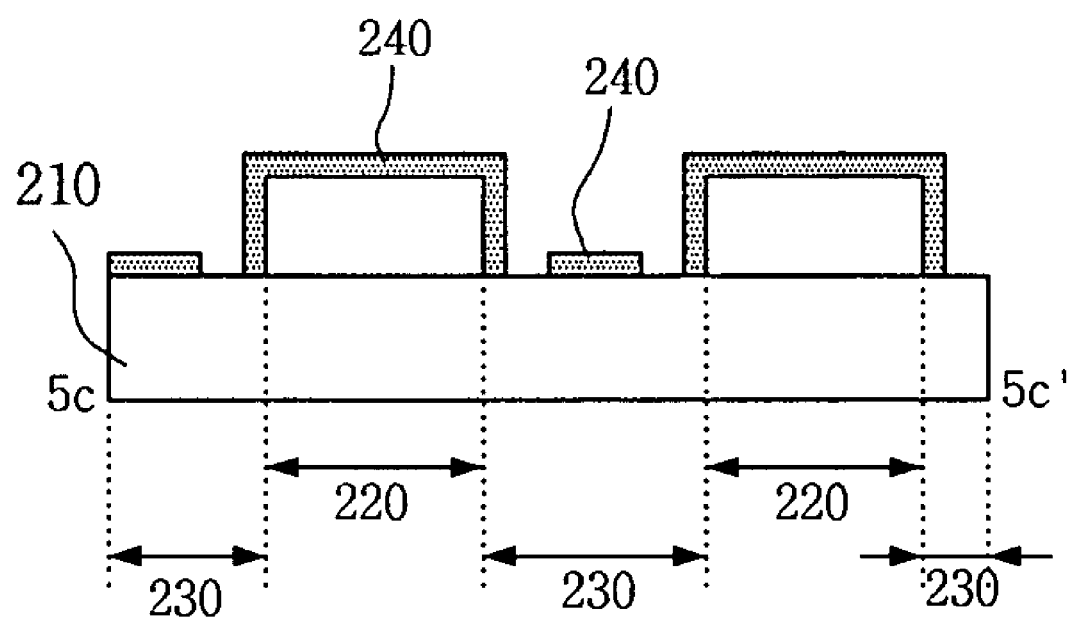
FIG. 5C is a cross-sectional view taken along line 5c-5c' of FIG. 5A.

FIG. 5A is a plane view of a mother glass 200 for a liquid crystal display according to a second exemplary embodiment of the present invention, FIG. 5B is a cross-sectional view taken along line 5b-5b' of FIG. 5A, and FIG. 5C is a cross-sectional view taken along line 5c-5c' of FIG. 5A.

Referring to FIG. 5A, the mother glass 200 includes a plurality of cell areas 220 where a plurality of thin films is formed on a transparent substrate 210, a dummy area 230 provided outside the plurality of cell areas 220 on the transparent substrate 210, and a passivation layer 240. The passivation layer 240 covers the entire surface of the transparent substrate 210 including the plurality of cell areas 220 and the dummy area 230, and includes an opening 242 on a predetermined portion thereof.

The mother glass 200 is cut along scribe lines (not shown) in a subsequent cutting process to form an array substrate or a color filter substrate in each cell area 220.

The plurality of cell areas 220 is arranged with a substantially constant distance therebetween. The plurality of thin films may be a TFT array or a color filter array based upon the array substrate or the color filter substrate. The dummy area 230 having a predetermined width is provided between the plurality of cell areas 220.

Each cell area 220 is divided into an active area 222 where an image is displayed, and a pad area 224 where a plurality of electrode pads for applying signals from the outside is formed at an edge of the active area 222. The pad area 224 may be provided not only at the edge of the active area 222 but also on an upper portion or a lower portion of the active area 222 adjacent to the edge of the active area 222, based upon a panel type.

The passivation layer 240 is coated on an overall portion of each cell area 220. In the dummy area 230, the passivation layer 240 is formed in a straight line-like band form along a transverse direction to isolate the cell areas 220 from each other in a longitudinal direction.

The mother glass 200 further includes a barrier 244, that is positioned between the cell areas 220 arranged in the transverse to isolate the neighboring cell areas 220 in the transverse from each other.

As illustrated in FIGS. 5B and 5C, the opening 242 of the passivation layer 240 is formed between the cell areas 220 arranged in the transverse direction and the barrier 244 is formed in the opening 242 such that the cell areas 220 in the transverse direction are isolated from each other. Furthermore, the passivation layer 240 is formed between the cell areas 220 arranged in a longitudinal direction such that the cell areas 220 in the longitudinal direction are isolated from each other.

Additionally, in the mother glass 200 according to the second exemplary embodiment, the passivation layer 240 and the barrier 244 are formed in a mesh form such that the neighboring cell areas 220 in the transverse and longitudinal directions are isolated from each other.

The passivation layer 240 and the barrier 244 may be formed of one of an organic material such as photoacryl and benzocyclobutene (BCB) and an inorganic material such as silicon oxide ($SiO_x$) and silicon nitride ($SiN_x$).

The passivation layer 240 and the barrier 244 may be formed of the same material, and also, may be formed of different materials. When the passivation layer 240 and the barrier 244 are formed of the same material, the barrier 244 can be formed during a formation process of the passivation layer 240. Accordingly, the barrier 244 can be formed without adding a separate process.

The passivation layer 240 may have a thickness of about 2.0-2.3 μm. Therefore, the opening 242 of the passivation layer 240 includes a cut surface 242a of about 2.0-2.3 μm thick.

The thickness of the barrier 244 may be substantially equal to the thickness of the passivation layer 240. However, the thickness of the barrier 244 is not limited thereto.

FIGS. 5B and 5C only have conceptually illustrated the passivation layer 240 coated on the plurality of cell areas 220. In fact, the structure of the passivation layer 240 coated on the plurality of cell areas 220 may vary in accordance with the structure of the thin films inside the cell areas 220.

Accordingly, because intersections formed by the cell areas 220 arranged in the transverse and longitudinal directions have a reduced area in each cell area 220 in the mother glass 200 for the liquid crystal display according to the second exemplary embodiment of the present invention, an increase in a flow amount of photoresist in the intersections is suppressed when the photoresist is coated during a subsequent photolithography process. As a result, the photoresist is uniformly coated on the entire portion of the cell areas 220, thereby preventing the appearance of screen stains.

Third Exemplary Embodiment

Figure 6A:
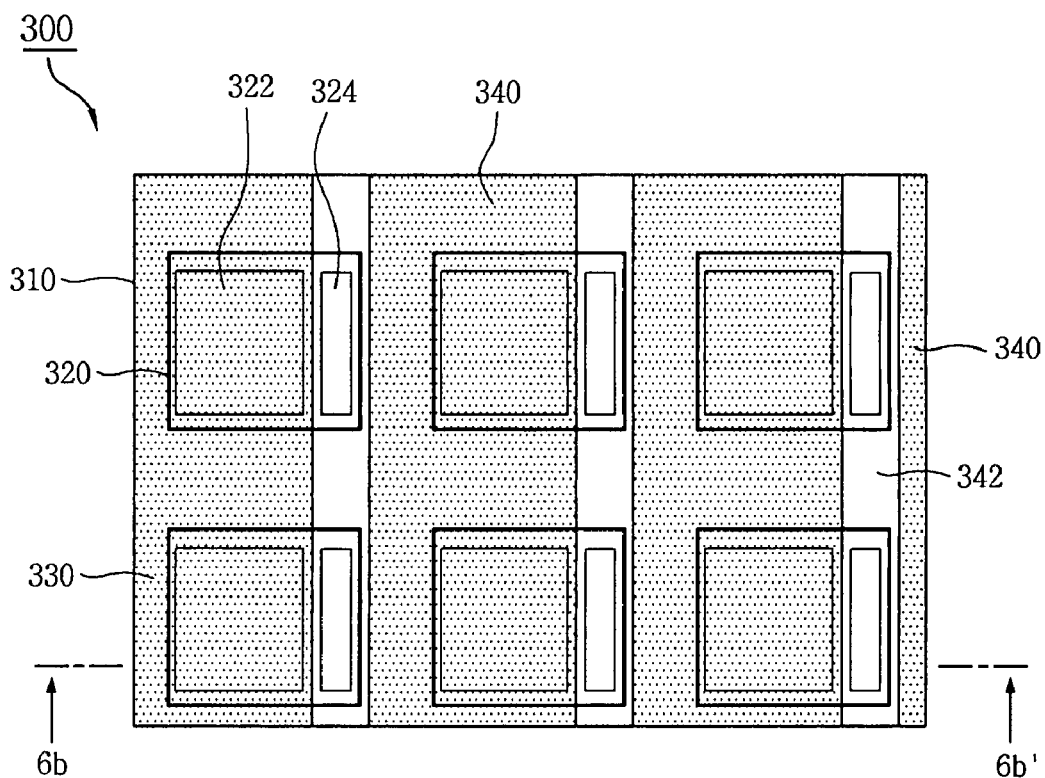
FIG. 6A is a plane view of a mother glass for a liquid crystal display according to a third exemplary embodiment of the present invention.
Figure 6B:
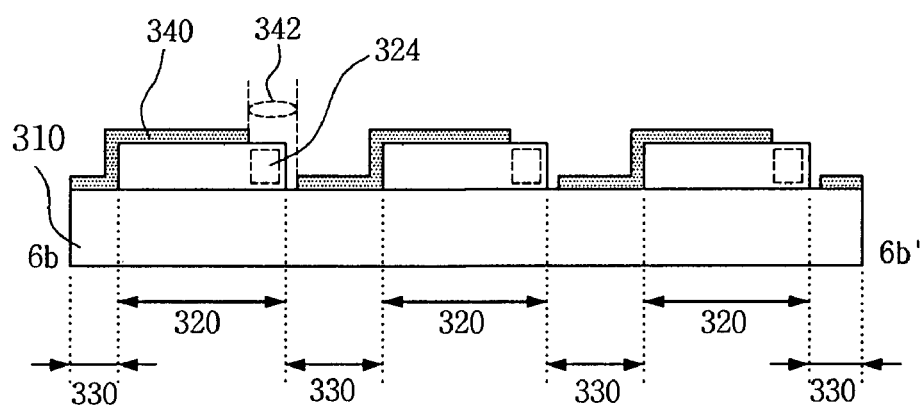
FIG. 6B is a cross-sectional view taken along line 6b-6b' of FIG. 6A.

FIG. 6A is a plane view of a mother glass 300 for a liquid crystal display according to a third exemplary embodiment of the present invention, and FIG. 6B is a cross-sectional view taken along line 6b-6b' of FIG. 6A.

The mother glass 300 according to the third exemplary embodiment is different from the mother glasses 100 and 200 according to the first and second exemplary embodiments in that the mother glass 300 has a structure for preventing stains appearing in a pad area of a cell area.

As illustrated in FIG. 6A, the mother glass 300 includes a plurality of cell areas 320 where a plurality of thin films is formed on a transparent substrate 310, a dummy area 330 provided outside the plurality of cell areas 320 on the transparent substrate 310, and a passivation layer 340. The passivation layer 340 covers the entire surface of the transparent substrate 310 including the plurality of cell areas 320 and the dummy area 330, and includes an opening 342 in a pad area 324 of the cell area 320.

Each cell area 320 is divided into an active area 322 where an image is displayed, and the pad area 324 where a plurality of electrode pads for applying signals from the outside is formed at an edge of the active area 322. The pad area 324 may be provided not only at the edge of the active area 322 but also on an upper portion or a lower portion of the active area 322 adjacent to the edge of the active area 322, based upon a panel type.

As illustrated in FIG. 6B, the passivation layer 340 are coated on the cell area 320 and the dummy area 330. The opening 342 of the passivation layer 340 is formed in the pad area 324 of the cell area 320 and the dummy area 330 adjacent to the pad area 324.

The opening 342 is extended along the pad area 324 arranged on the same line (i.e., a line in a longitudinal direction in FIG. 6A), and formed in a straight line-like form. In other words, the opening 342 is formed on the entire surface of the pad area 324 positioned in the longitudinal direction.

The passivation layer 340 may be formed of one of an organic material such as photoacryl and benzocyclobutene (BCB) and an inorganic material such as silicon oxide ($SiO_x$) and silicon nitride ($SiN_x$). The passivation layer 340 may have a thickness of about 2.0-2.3 μm.

Accordingly, because the pad area 324 of the cell area 320 has an open structure in the mother glass 300 for the liquid crystal display according to the third exemplary embodiment of the present invention, an increase in a flow amount of photoresist is suppressed when the photoresist is coated during a subsequent photolithography process. As a result, the photoresist is uniformly coated on the entire portion of the cell areas 320, thereby preventing the appearance of screen stains.

Figure 7:
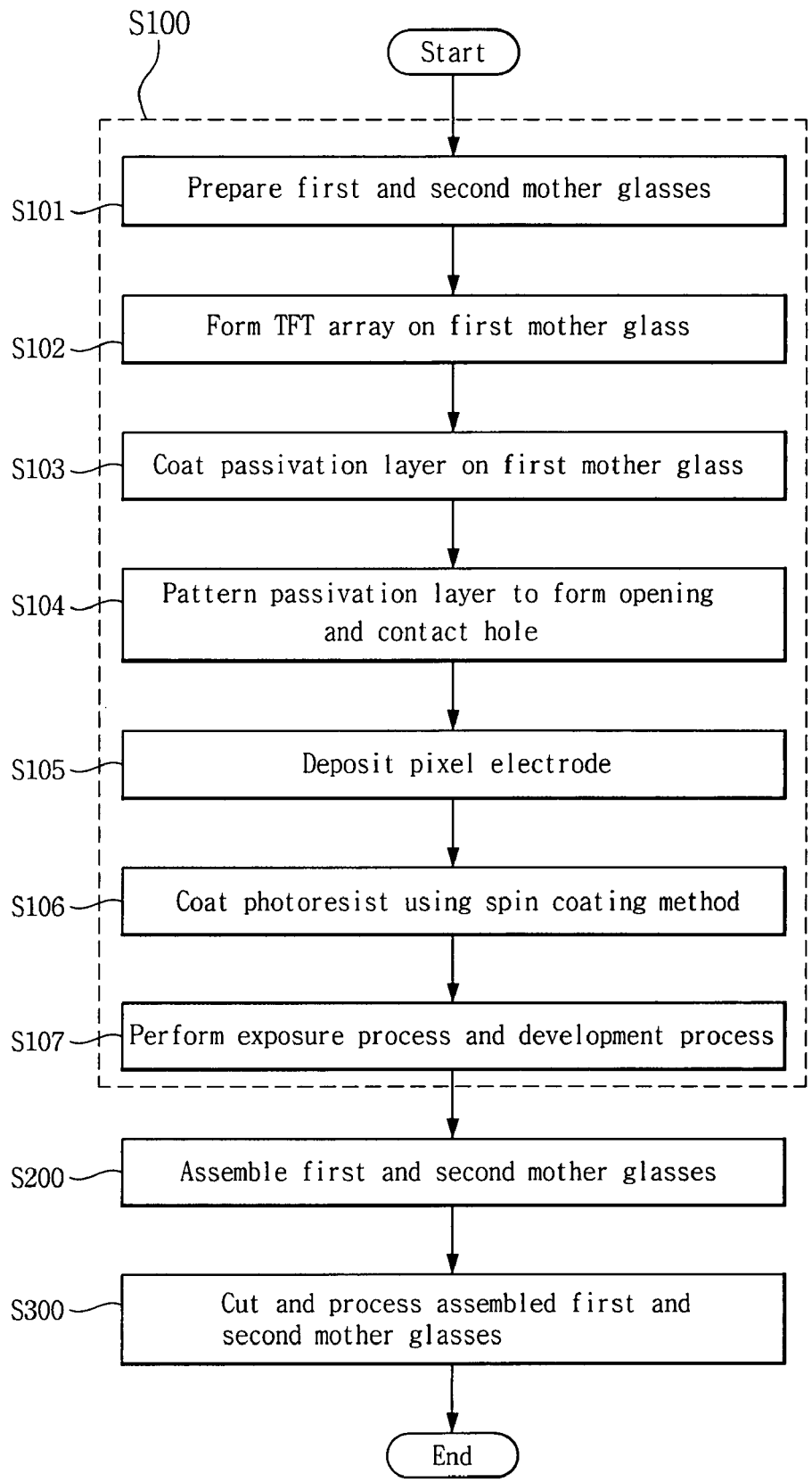
FIG. 7 is a flow chart explaining a method of fabricating a liquid crystal display using the mother glass according to the first, second and third exemplary embodiments of the present invention.

FIG. 7 is a flow chart explaining a method of fabricating a liquid crystal display using the mother glass according to the first, second and third exemplary embodiments of the present invention.

A method of fabricating a liquid crystal display includes an array process S100, a cell process S200, and a module process S300.

The array process S100 includes forming a TFT array including a gate line, a data line, a pixel electrode, a thin film transistor, and so forth on a first substrate, and forming a color filter array including a black matrix layer, a color filter layer, and so forth on a second substrate.

The array process S100 is not a process for forming one liquid crystal panel on one substrate, and is a process for designing a plurality of cell areas on a large-sized mother glass to form the TFT array or the color filter array in each cell area.

The array process S100 according to the first to third exemplary embodiments, as illustrated in FIG. 7, includes steps S101 to S107. First, in step S101, a first mother glass and a second mother glass including a color filter array are prepared.

In step S102, a plurality of cell areas is defined on the first mother glass, and an area outside the plurality of cell areas on the first mother glass is defined as a dummy area.

The plurality of cell areas is arranged on the first mother glass with a substantially constant distance therebetween. A TFT array including a gate line, a data line, a pixel electrode, a thin film transistor, and so forth is formed inside each cell area.

In step S103, a passivation layer is coated on the first mother glass on which the TFT array is formed.

In step S104, the passivation layer is patterned so that an opening is formed by opening a portion of the passivation layer in the dummy area. Further, an opening is formed in a contact hole for connecting a drain electrode to a pixel electrode in an active area of each cell area.

According to the first exemplary embodiment shown in FIG. 3A, the passivation layer 140 is coated on the entire surface of each cell area. In the dummy area 130, the passivation layer 140 is patterned between the cell areas 120 arranged in a longitudinal direction to isolate the cell areas 120 from each other in a longitudinal direction.

According to the second exemplary embodiment shown in FIG. 5A, the passivation layer 240 is coated on an overall portion of each cell area 220. In the dummy area 230, the passivation layer 240 is patterned to be formed between the cell areas 220 arranged in a longitudinal direction. Furthermore, the barrier 244 is formed between the cell areas 220 arranged in a transverse in the dummy area 230 to isolate the neighboring cell areas 220 in the transverse from each other.

According to the third exemplary embodiment shown in FIG. 6A, the passivation layer 340 may be patterned to be formed on the entire surface of the transparent substrate 310 except the pad area 324 of the cell area 320.

In step S105, the pixel electrode is deposited on the entire surface of the patterned passivation layer.

After the deposition of the pixel electrode, photoresist is coated using a spin coating method to pattern the pixel electrode in step S106.

The spin coating method is that photoresist is coated on a substrate, and then the substrate rotates to spread the photoresist from the center to edge of the substrate by centrifugal force produced by the rotation of the substrate until a desired thickness of a thin film is achieved.

In the spin coating method, the photoresist is gathered on the passivation layer, in particular, inside the opening having a predetermined thickness, and then flows along the surface of the opening. The photoresist is spread on the entire surface of the substrate such that a desired thickness of a thin film is achieved.

In this case, because the cell areas are isolated by the passivation layer, areas of openings of intersections formed by the cell areas are reduced. Accordingly, a flow amount of the photoresist does not increase and the photoresist can be uniformly coated.

In step S107, an exposure process and a development process are performed on the pixel electrode using the photoresist as a mask to complete the array process on the first mother glass.

The first mother glass including the TFT array and the second mother glass including the color filter array thus fabricated move to a subsequent cell process line.

In the cell process S200, a liquid crystal material is coated on the first mother glass and the second mother glass, and then a rubbing process is performed on the first mother glass and the second mother glass so that molecules of the liquid crystal material have uniform orientation. The rubbing process is performed after performing cleaning prior to coating an alignment layer, alignment layer printing, alignment layer firing, and alignment layer testing in turn.

Next, the first and second mother glasses are cleaned, and a liquid crystal is then formed on one of the first and second mother glasses to assemble the first and second mother glasses.

In the module process S300, the assembled first and second mother glasses are cut along scribe lines and processed to fabricate a unit liquid crystal display having the substantially constant size in each cell area.

According to the exemplary embodiments of the present invention, in the array process for fabricating the array substrate and the color filter substrate of the liquid crystal display, the photoresist can be uniformly coated on the passivation layer during the subsequent photolithography process by changing the structure of the passivation layer, thereby preventing the appearance of screen stains.

Accordingly, luminance of the liquid crystal display is improved by solving critical dimension (CD) variation between the electrodes is solved. Further, the appearance of stains can be prevented in spite of using the existing spin coating device. Because a separate device is not necessary, fabricating cost is reduced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mother glass for a liquid crystal display comprising:
   a plurality of cell areas where a plurality of thin films are disposed on a substrate;
   a dummy area disposed outside the plurality of cell areas on the substrate;
   a passivation layer including two portions, wherein a first portion is coated on substantially an overall portion of the plurality of cell areas, and a second portion is formed in a straight line-like band form in only a horizontal direction in the dummy area to isolate the cell areas neighboring in a vertical direction; and
   a barrier distinct from the passivation layer that is disposed in only the vertical direction in the dummy area to isolate the cell areas neighboring in the horizontal direction.

2. The mother glass for the liquid crystal display of claim 1, wherein the passivation layer has a thickness of about 2.0-2.3 µm.

3. The mother glass for the liquid crystal display of claim 1, wherein the barrier is formed of one of an organic material selected from the group consisting of photoacryl and benzocyclobutene and an inorganic material selected from the group consisting of silicon oxide and silicon nitride.

4. The mother glass for the liquid crystal display of claim 3, wherein the barrier is formed of the same material as the passivation layer.

5. The mother glass for the liquid crystal display of claim 1, wherein the barrier has substantially the same thickness as the passivation layer, and a top surface of the barrier is at a position lower than that of the passivation layer.

6. The mother glass for the liquid crystal display of claim 1, wherein the thin film is a thin film transistor array that includes a gate electrode divided from a gate line, a gate insulating layer disposed on the gate electrode, a semiconductor layer disposed on an upper portion of the gate insulating layer corresponding to the gate electrode, and a source electrode and a drain electrode that are spaced apart from each other with the semiconductor layer therebetween.

7. A method of fabricating a liquid crystal display comprising:
   preparing a first mother glass that includes a plurality of cell areas where a plurality of thin film transistor arrays is disposed, and a dummy area provided outside the plurality of cell areas;
   coating a passivation layer on substantially the entire surface of the first mother glass;

patterning the passivation layer to have two portions, wherein a first portion covers on substantially the entire surface of the plurality of cell areas, and a second portion has a straight line-like band form in only a horizontal direction in the dummy area to isolate the cell areas neighboring in a vertical direction; and forming a barrier distinct from the passivation layer in only the vertical direction in the dummy area to isolate the cell areas neighboring in the horizontal direction.

8. The method of claim 7, wherein the passivation layer is coated on substantially the entire surface of the first mother glass to have a thickness of about 2.0-2.3 μm.

9. The method of claim 7, wherein the barrier is formed of one of an organic material selected from the group consisting of photoacryl and benzocyclobutene and an inorganic material selected from the group consisting of silicon oxide and silicon nitride.

10. The method of claim 7, wherein the barrier is formed of the same material as the passivation layer.

11. The method of claim 7, wherein the barrier has substantially the same thickness as the passivation layer, and a top surface of the barrier is at a position lower than that of the passivation layer.

12. The method of claim 7, further comprising:

depositing a pixel electrode on the passivation layer;

coating a photoresist on the pixel electrode along an opening of the passivation layer;

patterning the pixel electrode using the photoresist as a mask;

forming a liquid crystal layer on one of the first mother glass and a second mother glass on which color filter arrays are formed;

assembling the first mother glass and the second mother glass to form a plurality of liquid crystal panels; and cutting the assembled first and second mother glasses.

\* \* \* \* \*